United States Patent
Katayama

(10) Patent No.: US 6,601,623 B1
(45) Date of Patent: Aug. 5, 2003

(54) PNEUMATIC TIRE

(75) Inventor: Masahiro Katayama, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/110,876

(22) Filed: Jul. 7, 1998

(30) Foreign Application Priority Data

Jul. 7, 1997 (JP) .............................................. 9-181571
Apr. 27, 1998 (JP) ........................................... 10-117541

(51) Int. Cl.$^7$ ............................ B60C 11/11; B60C 11/12
(52) U.S. Cl. ............................. 152/209.15; 152/209.23; 152/902; 152/DIG. 3
(58) Field of Search ...................... 152/209.15, 209.18, 152/209.19, 209.23, 209.25, 902, DIG. 3

(56) References Cited

U.S. PATENT DOCUMENTS

| | | | | |
|---|---|---|---|---|
| D187,575 S | * | 3/1960 | Caurette | ................. 152/209.15 |
| 3,707,177 A | * | 12/1972 | Boileau | ................. 152/209.18 |
| 4,934,424 A | * | 6/1990 | Kojima | ................... 152/DIG. 3 |
| 4,994,126 A | * | 2/1991 | Lagnier | .................. 152/DIG. 3 |
| 5,456,301 A | * | 10/1995 | Wise | ...................... 152/209.15 |

FOREIGN PATENT DOCUMENTS

| | | | | |
|---|---|---|---|---|
| DE | 1 480 932 | | 3/1969 | |
| EP | 0 282 765 | | 9/1988 | |
| EP | 0 378 090 | | 7/1990 | |
| EP | 0 543 267 A1 | | 5/1993 | |
| EP | 664230 | * | 7/1995 | ............ 152/DIG. 3 |
| FR | 925074 | * | 3/1951 | ............ 152/209.15 |
| JP | 1-273706 | * | 11/1989 | ............ 152/209.15 |
| JP | 3-109107 | * | 5/1991 | ............ 152/209.18 |
| JP | 3-139404 | * | 6/1991 | ............ 152/209.23 |
| JP | 4-212604 | * | 8/1992 | ............ 152/DIG. 3 |
| JP | 4-310407 | * | 11/1992 | ............ 152/DIG. 3 |
| JP | 8-207514 | * | 8/1996 | ............ 152/DIG. 3 |
| JP | 8-244419 | | 9/1996 | |
| JP | 09011712 | | 1/1997 | |
| WO | WO 94/21478 | | 9/1994 | |

OTHER PUBLICATIONS

Patent Abstracts of Japan—vol. 17, No. 123, Mar. 15, 1993, JP 04 306106, Bridgestone Corp. Oct. 28, 1992—Abstract.

* cited by examiner

*Primary Examiner*—Steven D. Maki
(74) *Attorney, Agent, or Firm*—Sughrue Mion, PLLC

(57) ABSTRACT

As shown in FIGS. 1 and 2, in a pneumatic tire of the present invention, block-shaped land portions 18 are divided by main grooves 14 and lug grooves 16 on the tread 12 of a studless tire 10 and a plurality of transverse sipings 20 is formed on each of the block-shaped land portions 18. Each sipings 20 is formed from a first linear portion 20A, a second linear portion 20B, and a sloping line portion 20C. The first linear portion 20A essentially extends in a direction perpendicular to the surface 18A of the block-shaped land portion 18 and contacts the surface 18A, the second linear portion 20B essentially extends in a direction perpendicular to the surface 18A and is separated from the surface 18A, and the sloping line portion 20C inclines to connect the ends of the first linear portion 20A and the second linear portion 20B. In each of the sipings 20, the position D1 of the sloping line portion 20C is set to 10% to 60% of the siping depth D. As a result, deterioration of ground-contacting performance when the number of sipings is increased is prevented. In this way, wet grip performance, braking performance on ice, traction performance, and irregular wear resistance can be improved.

2 Claims, 9 Drawing Sheets

F I G. 2
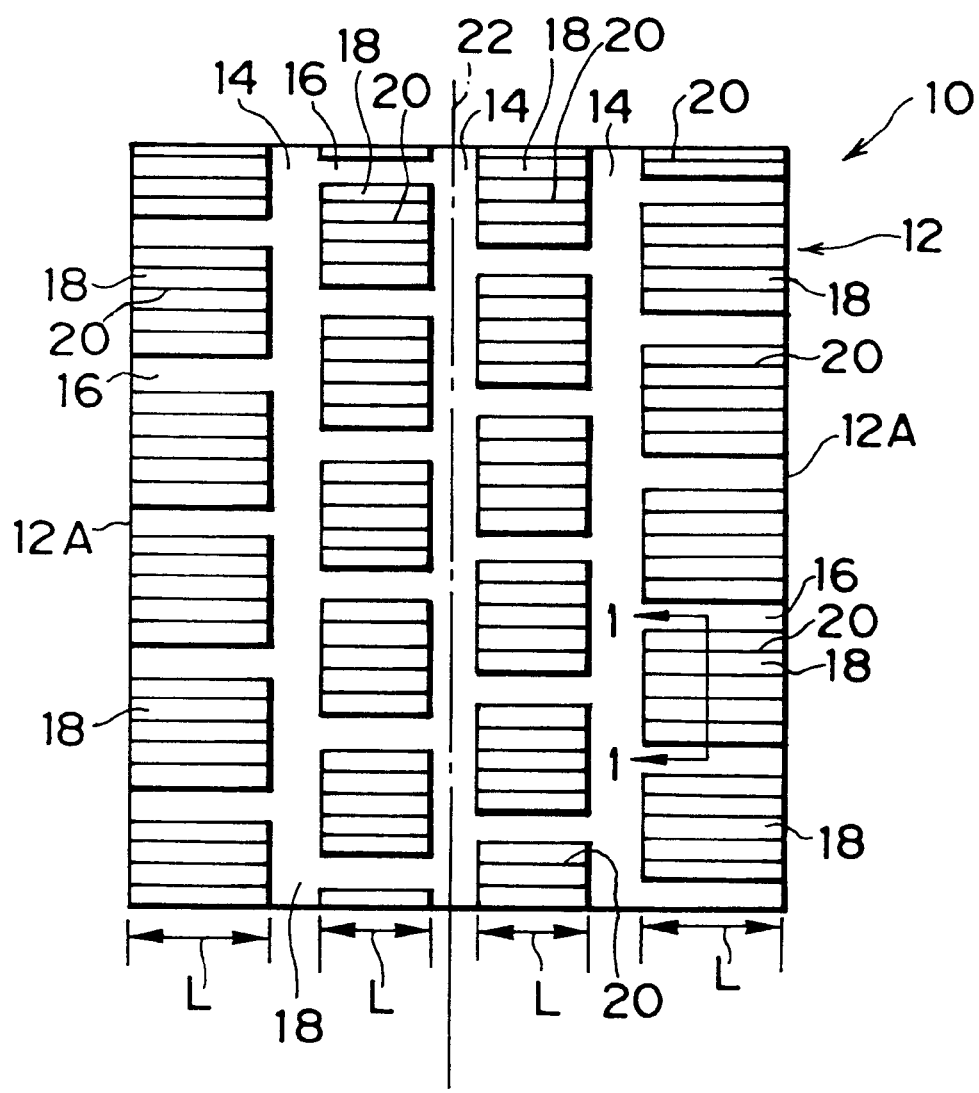

F I G. 3
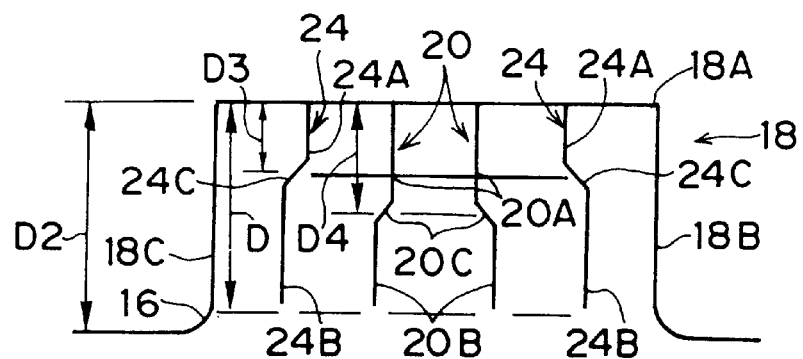
F I G. 4
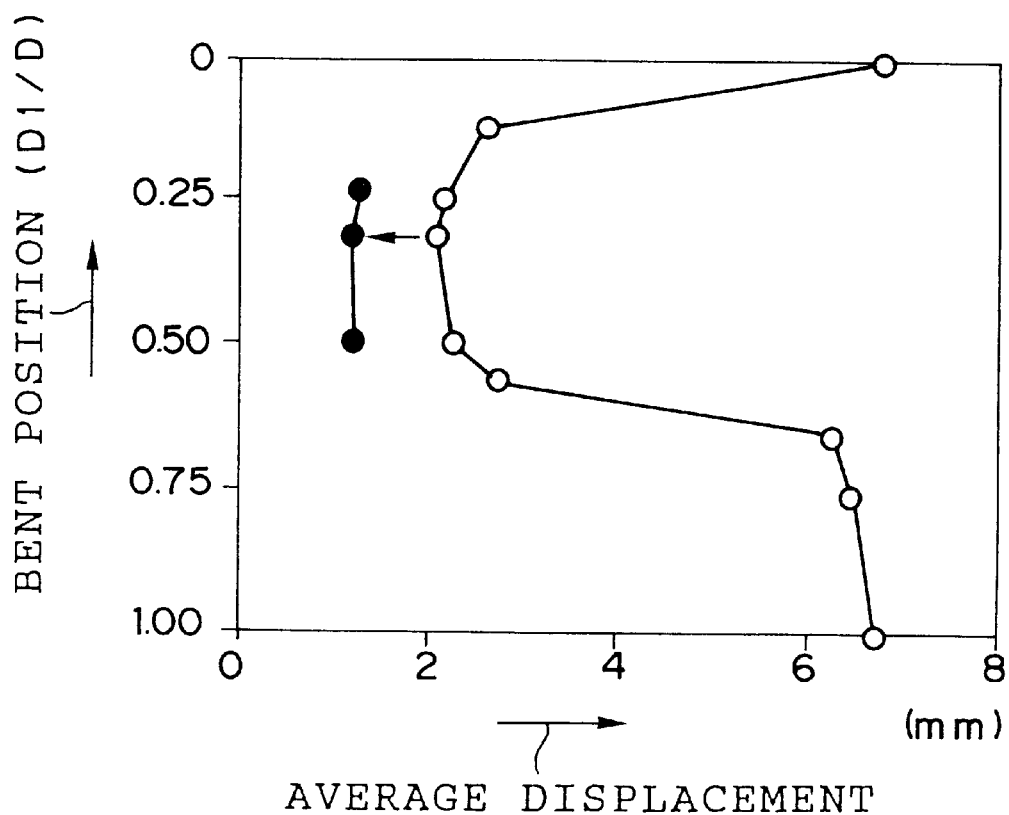

PNEUMATIC TIRE

BACKGROUND OF THE INVENTION

1. Field of the Invention

The present invention relates to a pneumatic tire, and more particularly to the improvement of a pneumatic tire which has excellent running performance on snow or icy road surfaces.

2. Description of the Related Art

In order to prevent dust pollution caused by spikes or studs projecting from tread portions, the use of spiked tires has been banned. Since then, various types of tires which do not have spikes and which have excellent running performance on snow or icy road surfaces have been developed. These are generically called studless tires. The characteristics which are substantially common to studless tires, include having the tread divided into a plurality of block-shaped land portions. As shown in FIG. 10, a plurality of vertical and transverse sipings 72, which extend straight in the depth direction of the block-shaped land portion 70, are formed on each of the divided block-shaped land portions 70. The tread land portions are formed block-shaped so that their grip on ice is improved, and the block-shaped land portions are subdivided by the transverse sipings so that the coefficient of friction on ice (edge effect) is improved by the plurality of block square portions which were formed by the subdivision.

However, in order to obtain a higher coefficient $\mu$ of friction on ice using conventional technology, it is necessary to increase the number of sipings. When the number of sipings is increased, ground-contacting performance deteriorates due to a decrease in the rigidity of the block-shaped land portions and the overall performance is not improved. In addition, irregular wear (heal-and-toe) is generated due to the deterioration of ground-contacting performance.

SUMMARY OF THE INVENTION

The present invention was developed in light of the above drawbacks, and an object thereof is to provide a pneumatic tire in which the deterioration of ground-contacting performance while increasing the number of sipings can be prevented, and as a result, wet grip performance, braking performance on ice, traction performance, and irregular wear resistance can be improved.

A pneumatic tire according to a first aspect of the present invention is a pneumatic tire provided with a tread divided into a plurality of block-shaped land portions, the periphery of each of the block-shaped land portions being bordered by a plurality of main grooves extending in the circumferential direction of the pneumatic tire, and by a plurality of lug grooves extending in the transverse direction of the pneumatic tire and intersecting the main grooves, and each of the block-shaped land portions having a plurality of sipings, the siping's comprising: a first linear portion which essentially extends in a direction perpendicular to the surface of the block-shaped land portion and contacts the surface; a second linear portion which essentially extends in a direction perpendicular to the surface of the block-shaped land portion and is separated from the surface of the block-shaped land portion; and a sloping line portion which connects the first linear portion and the second linear portion and is inclined in a direction towards the wall surface of the block-shaped land portion, wherein the position of the sloping line portion is set to between 10% to 60% of the siping depth.

Accordingly, in the pneumatic tire according to the first aspect of the present invention, since the position of the sloping line portion is set to the relatively shallow position of 10% to 60% of the siping depth, even when the number of sipings is increased, the bending rigidity of the block-shaped land portion is maintained and deformation is prevented. In this way, because the increase in the amount of deformation of the block-shaped land portions when the number of sipings is increased is less and deterioration of ground-contacting performance can be prevented, wet grip performance, braking performance on ice, traction performance, and irregular wear resistance can be improved.

A pneumatic tire according to a second aspect of the present invention is the pneumatic tire according to the first aspect of the present invention, wherein the tread includes block-shaped land portions each having at least four rows of sipings aligned in a transverse direction, and wherein the position of the sloping line portions of the outer sipings on the block-shaped land portions is at a shallower depth than the position of the sloping line portions of the inner sipings.

Therefore, in the pneumatic tire according to the second aspect of the present invention, as the position of the sloping line portion of the outer sipings is set at a shallower depth than the position of the sloping line portion of the inner sipings within the block-shaped land portion, even if the number of sipings is increased, the bending rigidity of the outer portions of the block-shaped land portion is maintained and deformation is further prevented. In this way, the increase in the amount of deformation of the block-shaped land portion when the number of sipings is increased is further reduced and deterioration of the ground-contacting performance can be further prevented. Consequently, wet grip performance, braking performance on ice, traction performance, and irregular wear resistance can be further improved.

A pneumatic tire according to a third aspect of the present invention is the pneumatic tire according to the first or second aspect of the present invention, wherein the sipings are disposed symmetrically with respect to a center line of each of the block-shaped land portions.

Therefore, in the pneumatic tire according to the third aspect of the present invention, in addition to the effects of the pneumatic tire according to the first or second aspect of the present invention, the bending rigidity of the block-shaped land portion is distributed evenly around the center line of the block.

A pneumatic tire according to a fourth aspect of the present invention is the pneumatic tire according to any of the first through third aspects, wherein the distance between the first linear portion and the second linear portion of the siping (i.e., the step) is not more than half the distance between adjacent sipings.

A pneumatic tire provided with a tread divided into a plurality of block-shaped land portions, the periphery of each of the block-shaped land portions being bordered by a plurality of main grooves extending in the circumferential direction of the pneumatic tire, and by a plurality of lug grooves extending in the transverse direction of the pneumatic tire and intersecting the main grooves, and each of the block-shaped land portions having a plurality of sipings, wherein: a wall surface of each of the block-shaped land portions on the lug groove side has a stepped configuration, and the base portion of the block-shaped land portions is larger than the tread portion of the block-shaped land portions.

Therefore, in the pneumatic tire according to the fifth aspect of the present invention, because the wall surface of the block-shaped land portions on the lug groove side has a stepped configuration and the base portion of the block-shaped land portion is larger than the tread portion thereof, even when the number of sipings is increased, the bending rigidity of the block-shaped land portion is maintained and deformation is prevented. In this way, the increase in the amount of deformation of the block-shaped land portion, when the number of sipings is increased, is reduced and deterioration of the ground-contacting performance can be prevented. Accordingly, wet grip performance, braking performance on ice, traction performance, and irregular wear resistance can be improved.

A pneumatic tire according to a sixth aspect of the present invention is the pneumatic tire according to the fifth aspect of the present invention, wherein the sipings have a stepped configuration along the wall surface.

Therefore, in the pneumatic tire according to the sixth aspect of the present invention, in addition to the effects of the pneumatic tire according to the fifth aspect of the present invention, because the sipings have a stepped configuration, the bending rigidity of the block-shaped land portions is reliably maintained and deformation is prevented.

A pneumatic tire according to a seventh aspect of the present invention is the pneumatic tire according to the sixth aspect of the present invention, wherein the sipings are disposed symmetrically with respect to a center line of each of the block-shaped land portions.

Therefore, in the pneumatic tire according to the seventh aspect of the present invention, in addition to the effects of the pneumatic tire according to the sixth aspect of the present invention, the bending rigidity of the block-shaped land portions is distributed evenly around the center line of the block.

A pneumatic tire according to an eighth aspect of the present invention is the pneumatic tire according to the sixth aspect of the present invention, wherein the position of the stepped portion of the wall surface is set closest to the tread surface, and the closer the siping is to the center line of the block-shaped land portion, the deeper the position of the stepped portion of that siping is set, i.e., the closer to the bottom of the lug groove.

Therefore, in the pneumatic tire according to the eighth aspect of the present invention, in addition to the effects of the pneumatic tire according to the sixth aspect of the present invention, the bending rigidity of the block-shaped land portion becomes gradually higher from the center line of the block to the wall surface of the block-shaped land portions at the lug groove side. Thus, the bending rigidity of the outer portions of the block-shaped land portions is maintained and deformation is further prevented.

A pneumatic tire according to a ninth aspect of the present invention is the pneumatic tire according to any of the fifth through eighth aspects, wherein the size of the steps of the wall surfaces is less than 4 mm.

Therefore, in the pneumatic tire according to the ninth aspect of the present invention, in addition to the effects of the pneumatic tire according to any of the fifth through eighth aspects of the present invention, since the volume of the groove portion can be guaranteed by a predetermined amount or more, reduction of wet braking performance can be prevented.

A pneumatic tire according to a tenth aspect of the present invention is the pneumatic tire according to any of the fifth through ninth aspects, wherein the depth of the stepped portions of the wall surfaces is 10% to 60% of at least one of the height of the block-shaped land portion and the siping depth.

Therefore, in the pneumatic tire of the tenth aspect of the present invention, in addition to the effects of the pneumatic tire according to any of the fifth through ninth aspects of the present invention, because the position of the stepped portion of the wall surface of the block-shaped land portions at the lug groove side is set relatively closer to the tread surface, even when the number of sipings is increased, the bending rigidity of the block-shaped land portions is maintained and deformation is prevented.

A pneumatic tire according to an eleventh aspect of the present invention is the pneumatic tire according to any of the fifth through tenth aspects, wherein the size of the steps of the sipings is not more than half the distance between adjacent sipings.

The pneumatic tires according to the first through eleventh aspects of the present invention can be manufactured in accordance with a present tire manufacturing method.

BRIEF DESCRIPTION OF THE DRAWINGS

FIG. 2 is a plan view which shows a portion of a tread of a pneumatic tire relating to a first embodiment of the present invention.

FIG. 3 is a cross-sectional view of a pneumatic tire relating to a second embodiment of the present invention in which hatching corresponding to FIG. 1 is omitted.

FIG. 4 is a graph which shows the relationship between the average displacement and the bent position of the tread block of each of the pneumatic tires relating to the present invention.

DESCRIPTION OF THE PREFERRED EMBODIMENTS

Figure 1:
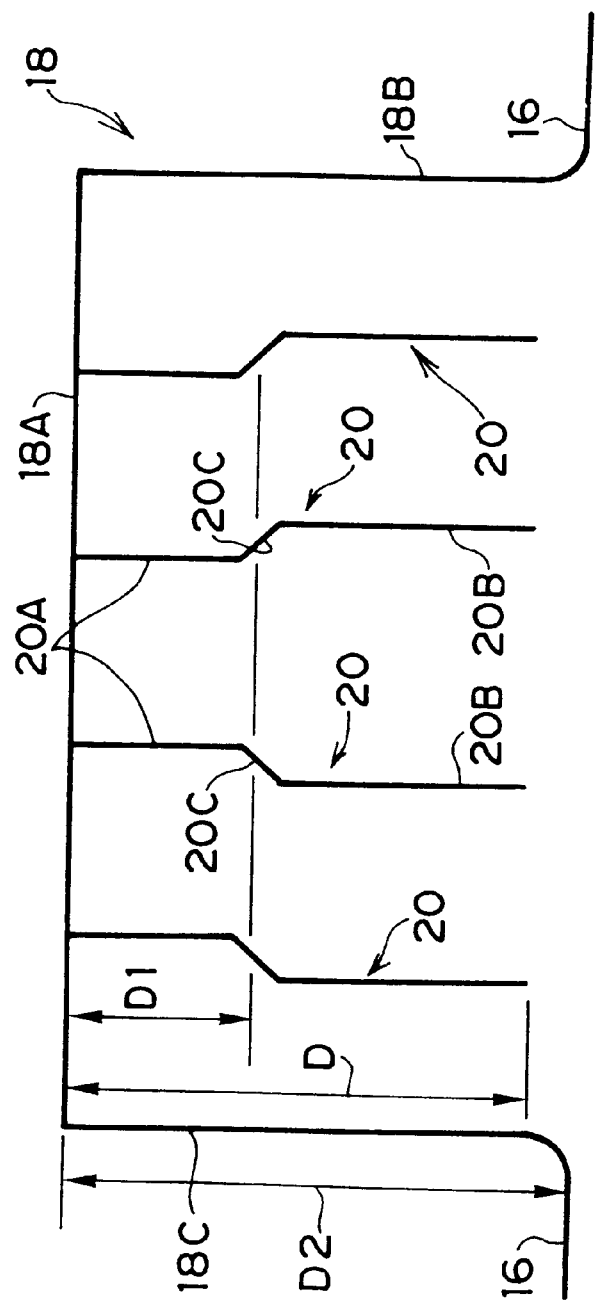
FIG. 1 is a cross-sectional view, taken along line 1—1 in FIG. 2, of a pneumatic tire in which hatching is omitted.

A pneumatic tire relating to a first embodiment of the present invention will be explained hereinafter with reference to FIGS. 1 and 2.

As shown in FIG. 2, on a tread 12 of a studless tire 10 which serves as a pneumatic tire in the present embodiment, a plurality of main grooves 14, which extend in the circumferential direction of the tire, and a plurality of lug grooves 16, which intersect the main grooves 14, are formed. Block-shaped land portions 18 are separated by the main grooves 14 and the lug grooves 16.

Further, a plurality of transverse sipings 20 is formed on each of the block-shaped land portions 18.

As shown in FIG. 1, each sipings 20 of the block-shaped land portions 18 comprises a first linear portion 20A, a second linear portion 20B, and a sloping line portion 20C. The first linear portion 20A essentially extends in a direction perpendicular to a surface 18A of the block-shaped land portion 18 and contacts the surface 18A. The second linear portion 20B essentially extends in a direction perpendicular to the surface 18A of the block-shaped land portion 18 and is separated from the surface 18A. The sloping line portion 20C connects the adjacent ends of the first linear portion 20A and the second linear portion 20B and which slopes down towards the bottom of the groove of whichever one of the lug groove wall surfaces 18B and 18C of the block-shaped land portion 18 is closer to it.

Namely, in the sipings 20 which are on the wall surface 18B side of the center of the block-shaped land portion 18, the sloping line portion 20C slopes downwards towards the wall surface 18B side from the surface 18A to the base of the block-shaped land portion 18. In the sipings 20 which are on the wall surface 18C side of the center of the block-shaped land portion 18, the sloping line portion 20C slopes downwards towards the wall surface 18C side from the surface 18A to the base of the block-shaped land portion 18.

Further, in the siping 20, the position D1 of the sloping line portion 20C, i.e., the distance from the surface 18A to the center position (stepped position) of the sloping line portion 20C, is set to 10% to 60% of the siping depth D.

Although not illustrated, the studless tire in the present invention has a known structure. Namely, longitudinal side walls and a crown portion including the tread 12, which extends over the longitudinal side walls, are formed in a toroidal shape, and the studless tire is reinforced by a carcass, which is formed by at least one sheet (usually two sheets) of fiber cord radial ply such as nylon and polyester or by one sheet of steel cord radial ply and is formed over one of the side walls to the other through the crown portion, and a non-extensible belt layer, which is disposed between the carcass and the tread 12 and includes a plurality of sheets of steel cord layers.

In the first embodiment shown in FIG. 2, the tread 12 has three main grooves 14 consisting of one groove running in the circumferential direction of the tire around the equatorial plane 22 thereof parallel with two other grooves running in the circumferential direction of the tire, one each on either side of the equatorial groove. Lug grooves 16 which intersect the main grooves 14 are disposed at predetermined intervals in the circumferential direction of the tire. The independent block-shaped land portions 18 are thereby separated by the main grooves 14 and between the main grooves 14 and the edges of the tread 12A. The axial direction width L, of the block-shaped land portions 18 which abut the tread edges 12A, i.e., the so-called shoulder blocks, is larger than that of the land portions 18 which do not abut the tread edges 12A.

In FIG. 2, the main grooves 14 and the lug grooves 16 are straight. However, the main grooves 14 can be a known groove such as a zigzag-shaped or crank-shaped groove which extends in the circumferential direction of the tire and has predetermined amplitude on both sides, and in the same manner, the lug grooves 16 can be a crank-shaped or substantially inverted V-shaped groove.

Further, regarding the transverse sipings 20 provided in the block-shaped land portions 18, in the first embodiment, each block-shaped land portion 18, which is rectangular when viewed from above, has four transverse sipings 20 spaced at substantially equal intervals symmetrically on either side of the center of the block.

Therefore, in the first embodiment, because the depth D1 is set to 10% to 60% of the siping depth D which is relatively shallow, the increase in the amount of deformation of the block-shaped land portions 18 when the number of sipings 20 is increased is reduced and deterioration of the ground-contacting performance can be prevented.

Namely, as shown in FIG. 4, compared to a siping having a configuration in which the position of the sloping line portion is not set to 10% to 60% of the siping depth D, in a siping having the configuration of the first embodiment, bending rigidity of the block-shaped land portions 18 is maintained and deformation is prevented. In this way, wet grip performance, braking performance on ice, traction performance, and irregular wear resistance can be improved.

Moreover, in addition to the straight sipings, the shape of the sipings 20, when viewed from above (FIG. 2), may be zigzag. Further, dead end transverse sipings, where one end of the siping 20 stops inside the block-shaped land portion 18, can be provided alternately staggered without completely crossing the block-shaped land portion 18 as do the sipings shown in FIG. 2. Alternatively, transverse sipings and dead end sipings can be appropriately combined.

Next, a pneumatic tire relating to a second embodiment of the present invention will be explained with reference to FIG. 3.

Members which are the same as those in the first embodiment are denoted by the same reference numerals, and descriptions thereof are omitted.

As shown in FIG. 3, in the second embodiment, transverse sipings, in which a pair of inner sipings 20 and a pair of outer sipings 24 are disposed in at least four rows, are formed on the block-shaped land portion 18. The depth D3 of a sloping line portion 24C of the outer sipings 24, i.e., the depth between the surface 18A and the center position (the stepped position) of the sloping line portion 24C, is set shallower than the depth D4 of a sloping line portion 20C of the inner sipings 20, i.e., the depth between the surface 18A and the center position (the stepped position) of the sloping line portion 20C.

Therefore, in the second embodiment, because the depth D3 is set shallower than the depth D4, even when the number of sipings is increased, bending rigidity in the outer portions of the block-shaped land portions 18 is maintained and deformation is further prevented. In this way, since the increase in the amount of deformation of the block-shaped land portions 18 when the number of sipings 20 is increased is further reduced and deterioration of the ground-contacting performance can be further prevented, wet grip performance, braking performance on ice, traction performance, and irregular wear resistance can be further improved.

Next, a pneumatic tire relating to a third embodiment of the present invention will be explained with reference to FIGS. 5 and 6.

Members which are the same as those in the first embodiment are denoted by the same reference numerals, and descriptions thereof are omitted.

Figure 5:
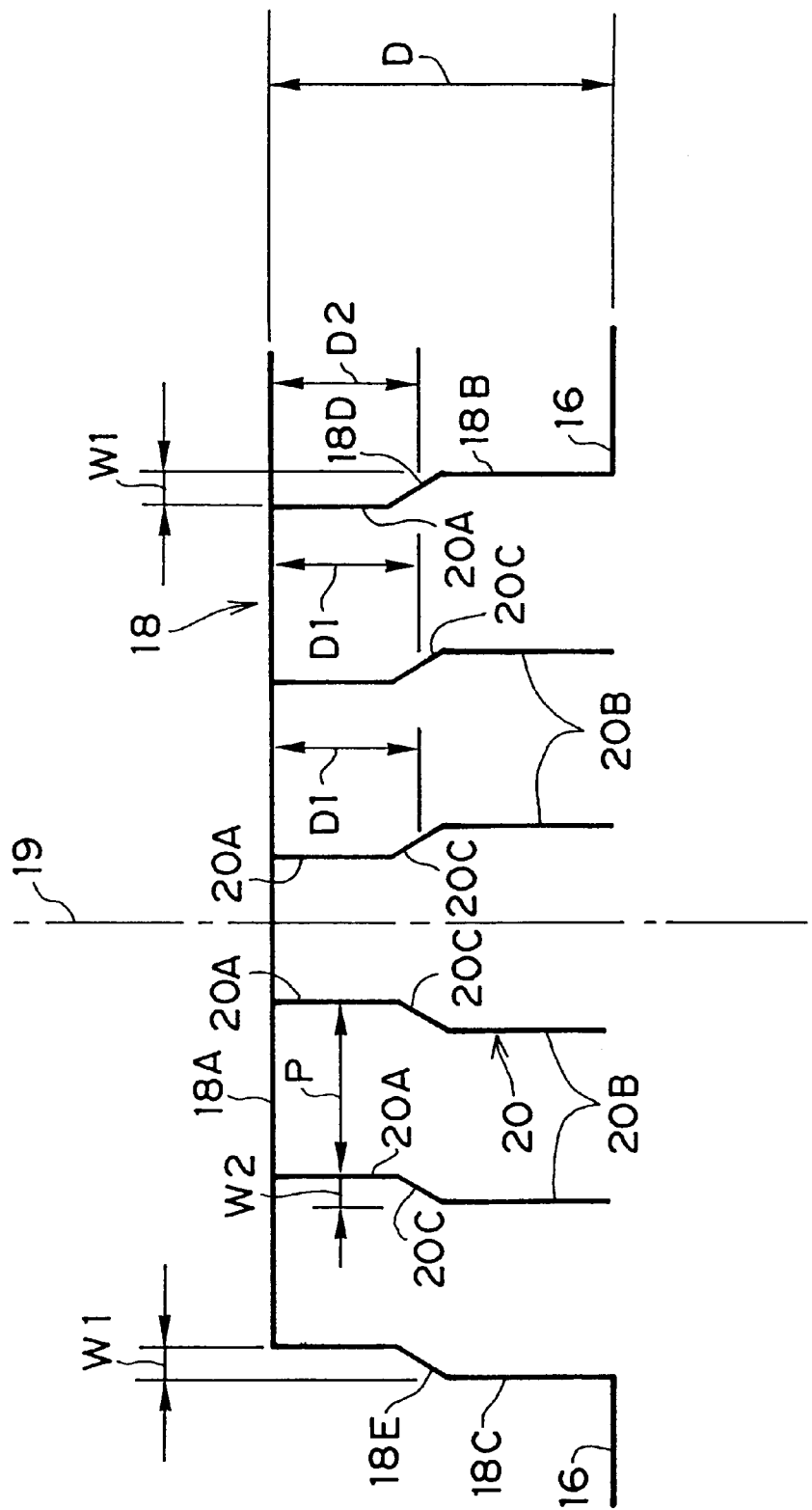
FIG. 5 is a cross-sectional view of a pneumatic tire relating to a third embodiment of the present invention in which hatching corresponding to FIG. 1 is omitted.
Figure 6:
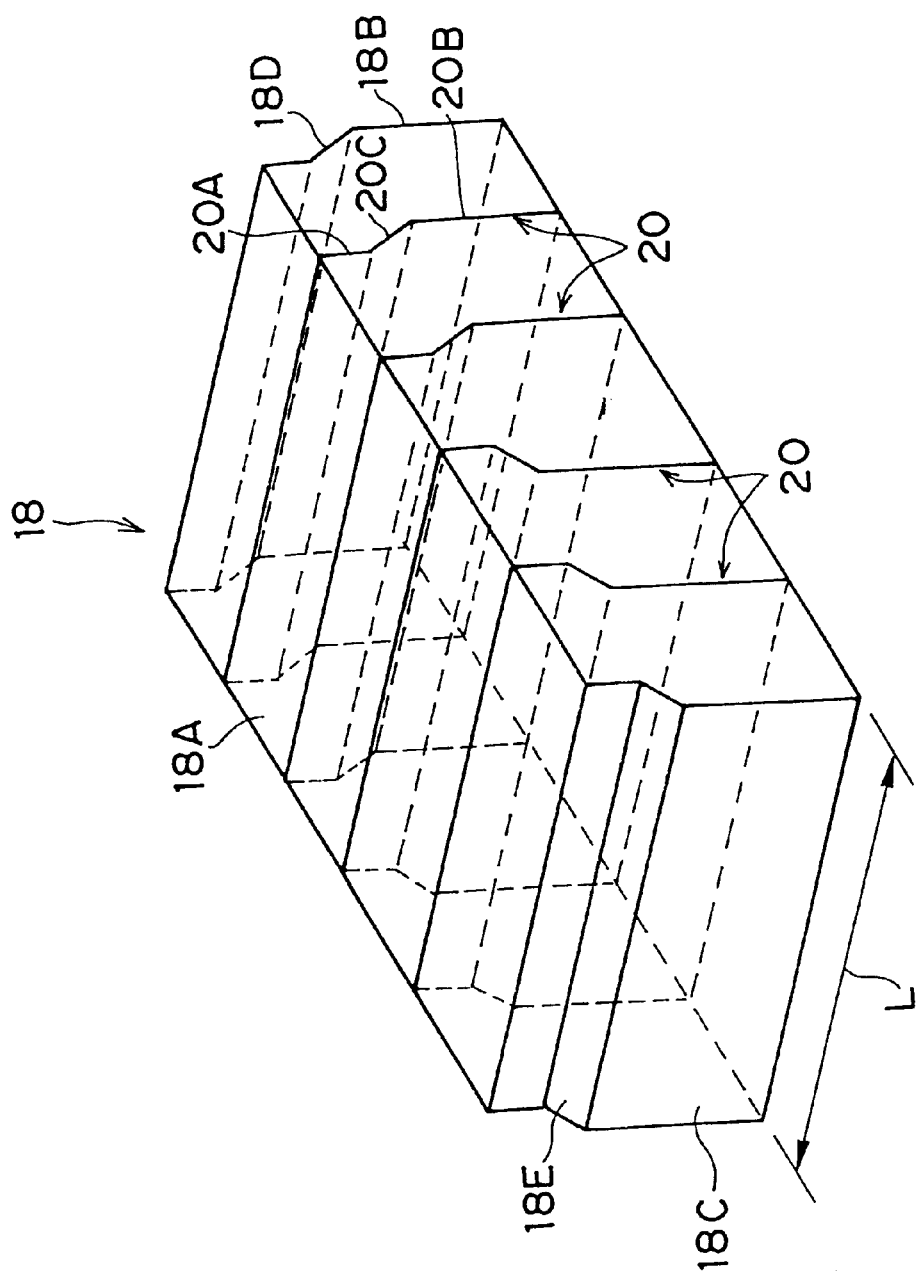
FIG. 6 is a perspective view which shows a block-shaped land portion of the pneumatic tire relating to the third embodiment of the present invention.

As shown in FIGS. 5 and 6, in the third embodiment, a siping 20 of a block-shaped land portion 18 comprises a first linear portion 20A, a second linear portion 20B, and a sloping line portion 20C. The first linear portion 20A essentially extends in a direction perpendicular to a tread 18A of the block-shaped land portion 18 and contacts the tread 18A. The second linear portion 20B essentially extends in a direction perpendicular to the tread 18A of the block-shaped land portion 18, is separated from the tread 18A, and is offset to a side which is away from a center line 19 of the block-shaped land portion 18 with respect to the first linear portion 20A. The sloping line portion 20C connects the adjacent end portions of the first linear portion 20A and the second linear portion 20B and slopes towards the bottom (the downward direction in FIG. 5) of a lug groove 16 from the first linear portion 20A to the second linear portion 20B.

Further, the wall surfaces 18B and 18C of the block-shaped land portion 18 at the lug groove 16 side have stepped configurations. The base portion of the block-shaped land portion 18 is larger than the tread portion thereof.

As shown in FIG. 5, in the third embodiment, the depth D1 of the sloping line portion 20C of the sipings 20, i.e., the distance from the surface 18A to the center position (the stepped position) of the sloping line portion 20C, is set equal to the depth D2 of the sloping line portion 18D (or 18E) of the wall surface 18B (or 18C), i.e., the distance from the surface 18A to the center position (the stepped position) of the sloping line portion 18D (or 18E), and the size W1 of the step of the wall surface 18B (or 18C) of the block-shaped land portion 18 is 4 mm or less.

Moreover, the depth D2 and the depth D1 are set to 10% to 60% of the height D (i.e., the siping depth) of the block-shaped land portion 18. Further, the size W2 of the step in the sipings 20 is set to ½ or less of the distance P between adjacent sipings 20.

Therefore, in the third embodiment, because step portions are provided at the wall surfaces 18B and 18C of the block-shaped land portion 18 and step portions are also provided at the sipings 20, the increase in the amount of deformation of the block-shaped land portions 18 when the number of sipings 20 is increased is reduced and deterioration of the ground-contacting performance can be prevented.

Further, in the third embodiment, because the depth D2 is set to 10% to 60% of the depth D of the block-shaped land portions 18 which is relatively close to the tread, even when the number of sipings is increased, the bending rigidity of the block-shaped land portions 18 is maintained and deformation is prevented.

Moreover, in the third embodiment, since the depth D1 is set to 10% to 60% of the siping depth D which is relatively shallow, the increase in the amount of deformation of the block-shaped land portions 18 when the number of sipings 20 is increased is reduced and deterioration of the ground-contacting performance can be prevented.

Next, a pneumatic tire relating to a fourth embodiment of the present invention will be explained with reference to FIG. 7.

Members which are the same as those in the third embodiment are denoted by the same reference numerals, and descriptions thereof are omitted.

Figure 7:
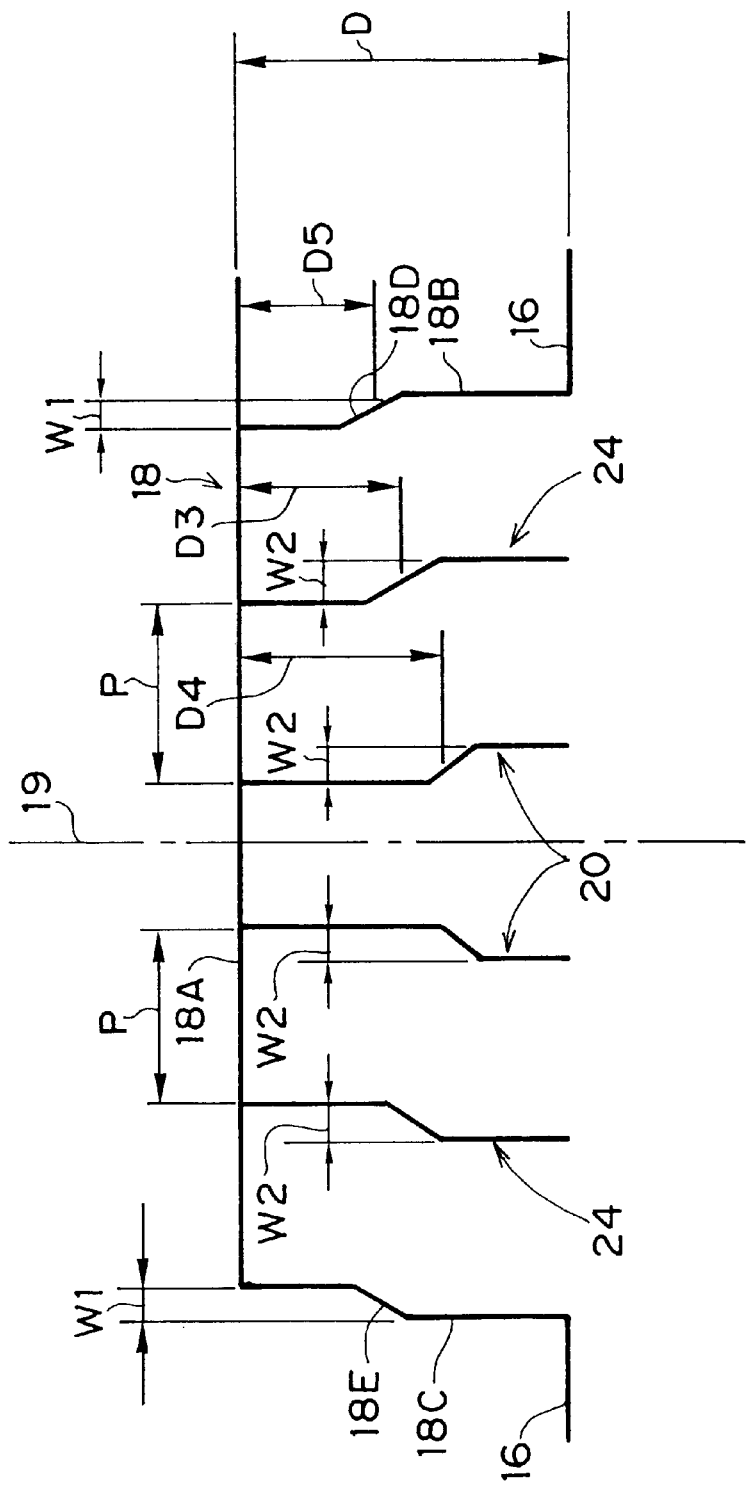
FIG. 7 is a cross-sectional view of a pneumatic tire relating to a fourth embodiment of the present invention in which hatching corresponding to FIG. 1 is omitted.

As shown in FIG. 7, in the fourth embodiment, transverse sipings, in which a pair of inner sipings 20 and a pair of outer sipings 24 are disposed in at least four rows with a center line 19 of a block-shaped land portion 18 therebetween, are formed on the block-shaped land portion 18. The depth D3 of a sloping line portion 24C of the outer siping 24, i.e., the distance from the surface 18A to the center position (the stepped position) of the sloping line portion 24C, is set shallower than the depth D4 of the sloping line portion 20C of the inner siping 20, i.e., the distance from the surface 18A to the center position (the stepped position) of the sloping line portion 20C.

The depth D5 of a sloping line portion 18D (or 18E) of a wall surface 18B (or 18C) of the block-shaped land portion 18, i.e., the distance from the surface 18A to the center position (the stepped position) of the sloping line portion 18D (or 18E) is set shallower than the depth D3.

Therefore, in the fourth embodiment, because the depth D3 is set shallower than the depth D4, and the depth D5 is set shallower than the depth D3, even when the number of sipings is increased, bending rigidity of the outer portions of the block-shaped land portions 18 is maintained and deformation is further prevented. In this way, since the increase in the amount of deformation of the block-shaped land portions 18 when the number of sipings 20 is increased is further reduced and deterioration of the ground-contacting performance can be further prevented, the wet grip performance, the braking performance on ice, the traction performance, and the irregular wear resistance can be further improved.

Next, a pneumatic tire relating to a fifth embodiment of the present invention will be explained with reference to FIG. 8.

Members which are the same as those in the third embodiment are denoted by the same reference numerals, and descriptions thereof are omitted.

Figure 8:
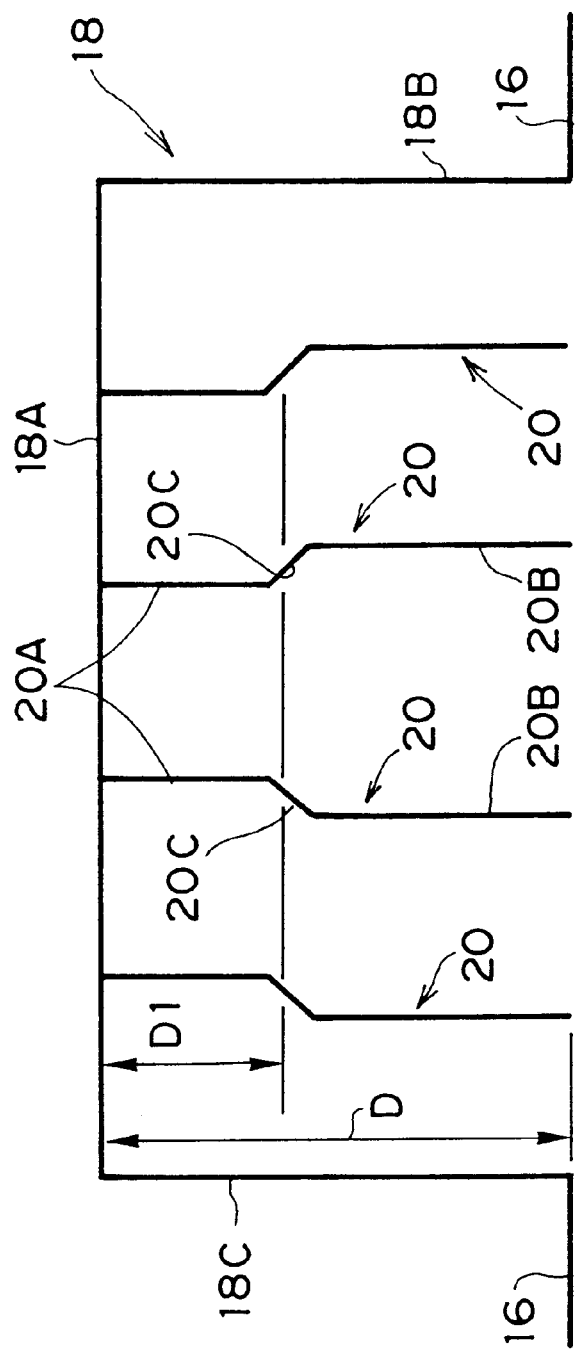
FIG. 8 is a cross-sectional view of a pneumatic tire relating to a fifth embodiment of the present invention in which hatching corresponding to FIG. 1 is omitted.

As shown in FIG. 8, in the fifth embodiment, the wall surfaces 18B and 18C of the block-shaped land portion 18 are straight, and step portions are not formed thereon.

In the fifth embodiment, because the depth D1 of a sloping line portion 20C of a siping 20, i.e., the distance from the surface 18A to the center position (the stepped position) of the sloping line portion 20C, is set to 10% to 60% of the height D (i.e., the siping depth) of the block-shaped land portion 18 which is relatively shallow, the increase in the amount of deformation of the block-shaped land portions 18 when the number of sipings 20 is increased is reduced and deterioration of ground-contacting performance can be prevented.

Test Example 1

In order to verify the effects of the present invention, a test was carried out using a block sample, to which the present invention was applied. (The sample was flat-pressed on ice at 2.5 kgf/cm² and slid at 20 km/h.)

At first, sipings 20 bent at the same depth were disposed as shown in FIG. 1. The depth D1 of the sloping line portion 20C, i.e., the distance from the surface 18A to the center position (the stepped position) of the sloping line portion 20C, was changed, and the average displacement of the block-shaped land portions 18 was measured. The results shown by the white circles in FIG. 4 were obtained.

From the results, it is clear that, when the sipings 20 were bent at the depth of 10% to 60% of siping depth D, deformation (average displacement) of the block-shaped land portions 18 was prevented.

Further, as shown in FIG. 3, in a block-shaped land portion 18, the position D3 of a sloping line portion 24C of an outer siping 24, i.e., the distance from the surface 18A to the center position (the stepped position) of the sloping line portion 24C, was set shallower by 20% than the depth D4 of the sloping line portion 20C of an inner siping 20, i.e., the distance from the surface 18A to the center position (the stepped position) of the sloping line portion 20C. The depths D3 and D4 were changed, and the average displacement of the block-shaped land portions 18 was measured. The results shown by the black circles in FIG. 4 were obtained.

From the results, it is clear that, as the depth D3 was set shallower than the depth D4 by 20%, deformation (average displacement) of the block-shaped land portions 18 was further prevented.

Test Example 2

In order to verify the effects of the present invention, the braking performance on ice of the aforementioned tires was tested. The tire size was 185/70R14. The tires were placed on a vehicle and the vehicle was driven at 20 km/h. The brakes were fully applied while the vehicle was running and the distance between the point at which the brakes were applied and the point at which the vehicle stopped was measured. The inverse number of the measured distance was regarded as the braking performance on ice and expressed as an index number. The results are shown in Table 1.

Figure 10:
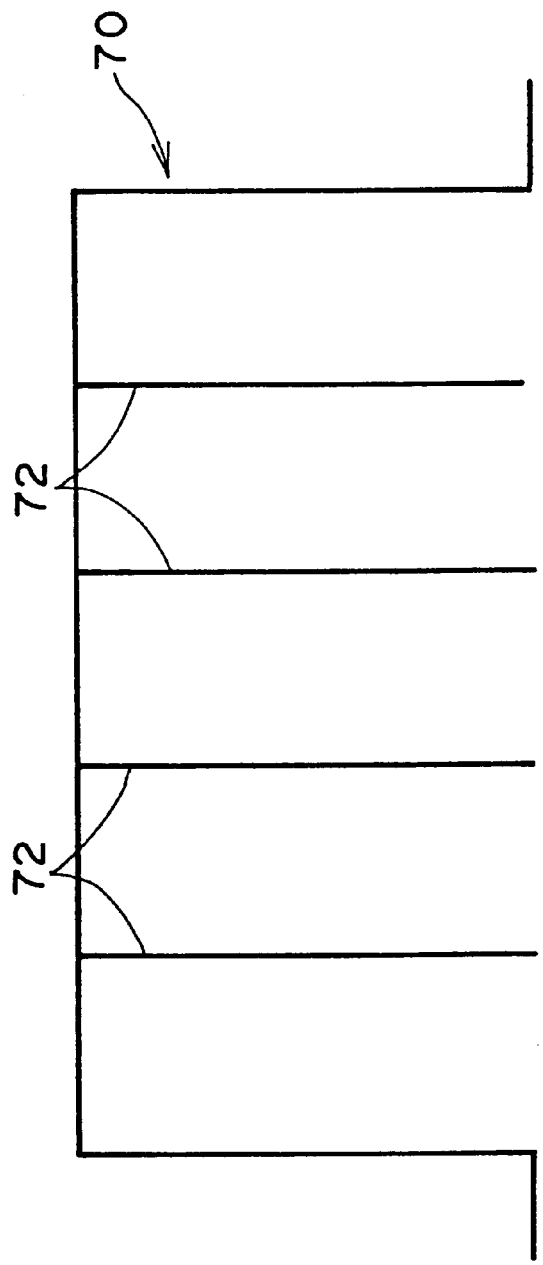
FIG. 10 is a cross-sectional view of a pneumatic tire relating to a conventional example in which hatching corresponding to FIG. 1 is omitted.

The tires used are as follows: a Comparative Example pneumatic tire of as shown in FIG. 10 in which straight sipings 72 are formed on a block-shaped land portion 70; a tire as shown in FIG. 1 in which sipings 20, having a siping depth D and the depth D1 of the sloping line portions 20C, are symmetrically disposed (D1 is 5%, 10%, 30%, 60%, 70% of D); a tire as shown in FIG. 3 in which the depth D3 of a sloping line portion 24C of an outer siping 24 is 30% of siping depth D and the depth D4 of a sloping line portion 20C of an inner siping 20 is 50% of the siping depth D (dimensions of the block-shaped land portions 18 of each of the tires are as follows: block length is 20 mm; block width is 20 mm; block height D2 is 10 mm; siping width is 0.4 mm; and siping depth D is 7 mm).

TABLE 1

| | D1/D | | | | | |
|---|---|---|---|---|---|---|
| Tire Used | Straight | 5% | 10% | 30% | 60% | 70% | Outer 30%, Inner 50% |
| Braking Performance on Ice | 100 | 100 | 103 | 105 | 103 | 100 | 107 |

From the results shown in Table 1, it is clear that the tires of the present invention, i.e., the tire in which the depth D1 of the sloping line portion 20C is set to 10% to 60% of the siping depth D and the tire in which the depth D3 of the sloping line portion 24C of the outer siping 24 is 30% of the siping depth D and the depth D4 of the sloping line portion 20C of the inner siping 20 is 50% thereof, had excellent braking ability on ice.

Test Example 3

In order to verify the effects of the present invention, a test was carried out using a block sample, to which the present invention was applied. (The sample was flat-pressed at 2.5 kgf/cm² on ice and slid at 20 km/h.) Because the size of the siping steps W2 has to be ½ or less (W2≦½) of the distance between sipings P due to the limitations in the manufacturing of a tire, the size of the siping steps W2 was 1 mm.

Figure 9:
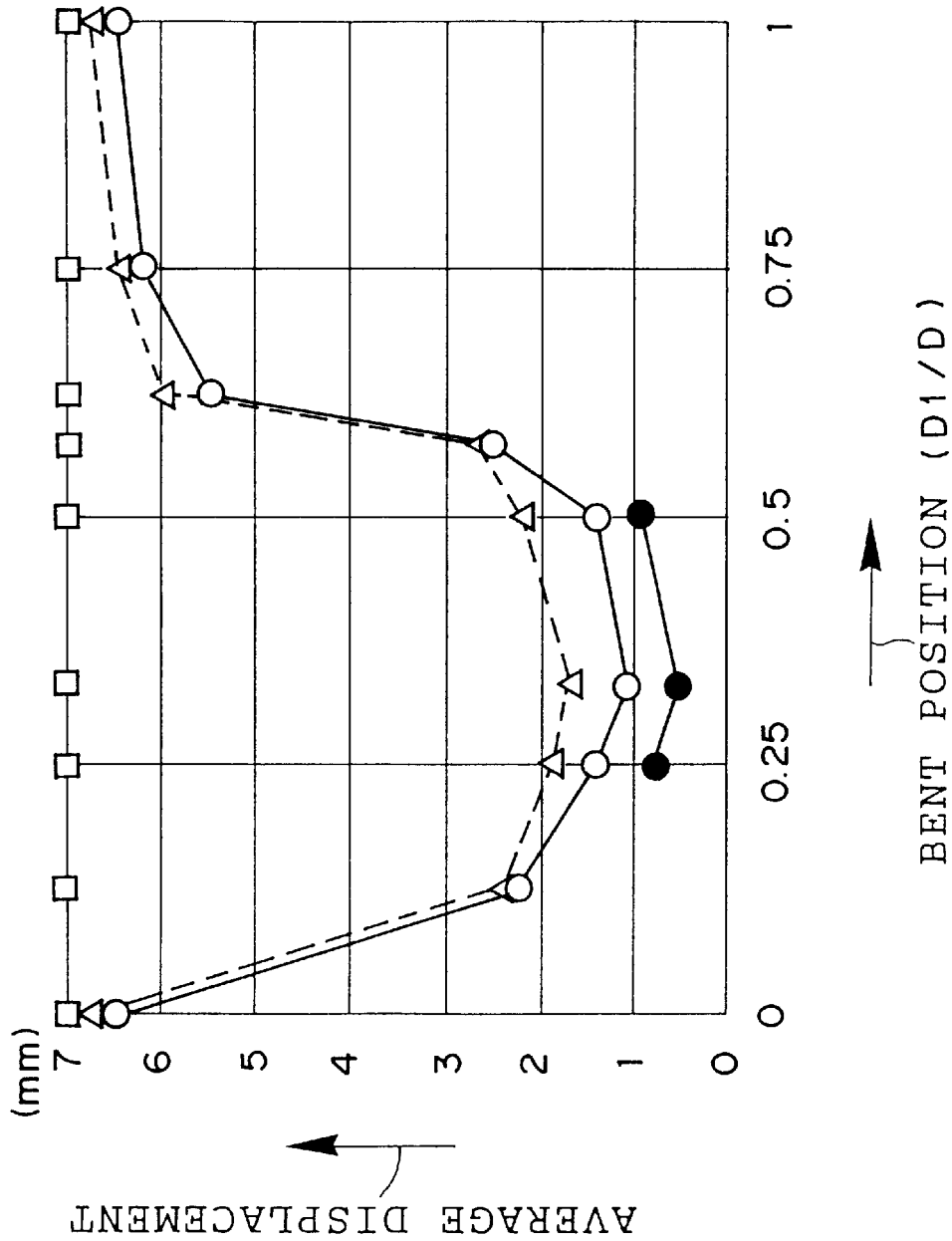
FIG. 9 is a graph which shows the relationship between the average displacement and the bent position of the tread block of each of the pneumatic tires relating to the present invention.

At first, as shown in FIG. 10, a plurality of vertical and transverse sipings 72, which extend straight in the depth direction of a block-shaped land portion 70, was formed on each of the block-shaped land portions 70. The average displacement of the block-shaped land portions 70 was measured. The results shown by the white squares in FIG. 9 were obtained.

Further, as shown in FIG. 5, step portions were formed on each of the wall surfaces 18B and 18C of a block-shaped land portion 18 (the depth D2 was constant), and sipings 20 having the step portions at the same positions were disposed. The depth D1 of the step portions of the sipings 20 was changed and the average displacement of the block-shaped land portions 18 was measured. The results shown by the white circles in FIG. 9 were obtained.

Moreover, as shown in FIG. 8 (the fifth embodiment), step portions were not formed on the wall surfaces 18B and 18C of a block-shaped land portion 18 and the sipings 20 having the step portions at the same positions were disposed. The depth D1 of the step portions of the sipings 20 was changed and the average displacement of the block-shaped land portions 18 was measured. The results shown by the white triangles in FIG. 9 were obtained.

From the results, it is clear that, when the depth D1 of the sloping line portions 20C was set to 10% to 60% of the height D (siping depth) of the block-shaped land portions 18, deformation (average displacement) of the block-shaped land portions 18 was prevented.

Further, as shown in FIG. 7 (the fourth embodiment), in a block-shaped land portion 18, the center position (step position) D3 of a sloping line portion 24C of an outer siping 24 was further set deeper than the depth D5 of the step positions of each of the wall surfaces 18B and 18C by 20% of siping depth D, and the average displacement of the block-shaped land portions 18 was measured. The results shown by the black circles in FIG. 9 were obtained.

From the results, it is clear that, as the center position (step position) D3 of the sloping line portions 24C of the outer sipings 24 was further set deeper than the depth D5 of the step positions of each of the wall surfaces 18B and 18C by 20%, deformation (average displacement) of the block-shaped land portion 18 was further prevented.

Test Example 4

In order to verify the effects of the present invention, the braking performance on ice and the wet braking performance of the aforementioned tires was tested. The tire size was 185/70R14. Regarding braking performance on ice, the tires were placed on a vehicle and the vehicle was driven at 20 km/h. The brakes were fully applied while the vehicle was running and the distance between the point at which the brakes were applied and the point at which the vehicle stopped was measured. The inverse number was regarded as the braking performance on ice and expressed as an index number. The results are shown in Table 2. Regarding wet braking performance, the vehicle was driven at 60 km/h and the brakes were fully applied while the vehicle was running. The distance between the point at which the brakes were applied and the point at which the vehicle stopped was measured. The inverse number was regarded as the wet braking performance and expressed as an index number. The results are shown in Table 2.

The tires used are as follows: a pneumatic tire (conventional tire) as shown in FIG. 10 in which straight sipings 72 are formed on a block-shaped land portion 70; a tire (tire of Example 3) as shown in FIG. 5 in which the sipings 20 (D is 10 mm and D1 is 4 mm) are symmetrically disposed, the size of the steps W1 of each of the wall surfaces 18B and 18C of the block-shaped land portions 18 is 1, 2, 3, and 4 mm, and the depth D2 of the step portion of the each of the wall surfaces 18B and 18C is 4 mm (wherein, the surface area of the ground-contacting portion is constant); a tire (tire of Example 4) as shown in FIG. 5 in which sipings 20 (D is 10 mm and D1 is 5 mm) are symmetrically disposed, the size of the steps W1 of each of the wall surfaces 18B and 18C of the block-shaped land portions 18 is 2 mm, and the depth D2 of the step portions of each of the wall surfaces 18B and 18C is 4 mm; a tire (tire of Example 5) as shown in FIG. 7 in which an inner siping 20 (D is 10 mm and D4 is 6 mm) and an outer siping 24 (D is 10 mm and D3 is 5 mm) are symmetrically disposed, the size of the steps W1 of each of the wall surfaces 18B and 18C of the block-shaped land portions 18 is 2 mm, and the depth D5 of the step portions of each of the wall surfaces 18B and 18C is 4 mm.

Dimensions of the block-shaped land portions 18 of each of the tires are as follows: block length is 30 mm; block width is 20 mm; block height (i.e., siping width) is 10 mm; and siping width is 0.4 mm).

TABLE 2

| Ties Used | Conventional Tire | Example 3 Tire | | | | Example 4 Tire (W1 = 2 mm) | Example 5 Tire (W1 = 2 mm) |
|---|---|---|---|---|---|---|---|
| | | W1 = 1 mm | W1 = 2 mm | W1 = 3 mm | W1 = 4 mm | | |
| Braking Performance on Ice | 100 | 103 | 105 | 106 | 106 | 107 | 108 |
| Wet Braking Performance | 100 | 102 | 103 | 100 | 96 | 104 | 105 |

From the results shown in Table 2, it is clear that the tires of the Examples of the present invention had excellent braking performances on ice. Moreover, regarding the tire of Example 3, the larger the size of the steps W1 of each of the wall surfaces 18B and 18C of the block-shaped land portions 18, the smaller the volume of the lug groove portion and the lower the wet braking performance. Furthermore, when the size of the steps W1 was 4 mm, the wet braking performance was 96 compared to 100 of the conventional tire. Accordingly, when the size of the steps W1 was 4 mm or more, the wet braking performance was likely to decrease. As a result, it is preferable that the size of the steps W1 of each of the wall surfaces 18B and 18C of the block-shaped land portions 18 be less than 4 mm.

As explained hereinbefore, because the pneumatic tire of the present invention is structured as described above, the present invention achieves a superior effect in that the wet grip performance, braking performance on ice, traction performance, and irregular wear resistance are improved.

What is claimed is:

1. A pneumatic tire provided with a tread divided into a plurality of block-shaped land portions, the periphery of each of said block-shaped land portions being bordered by a plurality of main grooves extending in the circumferential direction of said pneumatic tire, and by a plurality of lug grooves extending in the transverse direction of said pneumatic tire and intersecting said main grooves, and each of said block-shaped land portions having at least four sipings aligned in a transverse direction, each of said sipings comprising:

a first linear portion which essentially extends in a direction perpendicular to the surface of said block-shaped land portion and contacts the tread surface;

a second linear portion which essentially extends in a direction perpendicular to the surface of said block-shaped land portion and is separated from the surface of said block-shaped land portion; and a sloping line portion which connects said first linear portion and said second linear portion and is inclined in a direction towards a wall surface of said block-shaped land portion, so as to define a step, wherein a position of a center of said sloping line portion is set to between 10% to 60% of the siping depth measured from said tread surface; and wherein the position of the sloping line portions of the outer sipings on the block-shaped land portions is at a shallower depth than the position of the sloping line portions of the inner sipings.

2. A pneumatic tire provided with a tread divided into a plurality of block-shaped land portions, the periphery of each of said block-shaped land portions being bordered by a plurality of main grooves extending in the circumferential direction of said pneumatic tire, and by a plurality of lug grooves extending in the transverse direction of said pneumatic tire and intersecting said main grooves, and each of said block-shaped land portions having at least four sipings aligned in a transverse direction, wherein:

a wall surface of each of said block-shaped land portions on a lug groove side has a stepped configuration defining a stepped portion and a base portion of said block-shaped land portions is larger than a tread portion of said block-shaped portions;

wherein said sipings have a stepped configuration defining a step along said wall surface; and wherein the position of the step of said wall surface is set closest to the tread surface, and the closer said siping is to the center line of said block-shaped land portion, the closer to the bottom of the lug groove the position of the stepped portion of said siping is set.

* * * * *